June 4, 1929.  M. MACK  1,716,179
UTENSIL FOR COOKING RANGES
Filed Nov. 8, 1928
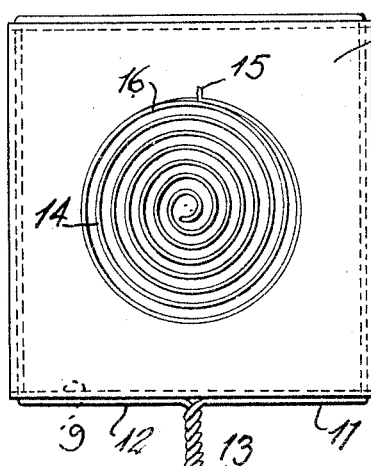
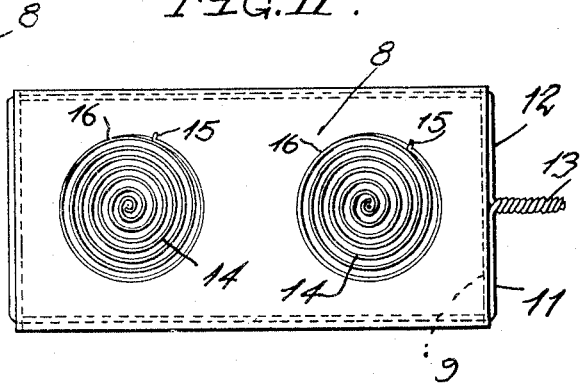
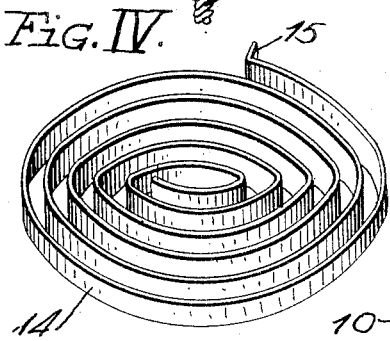
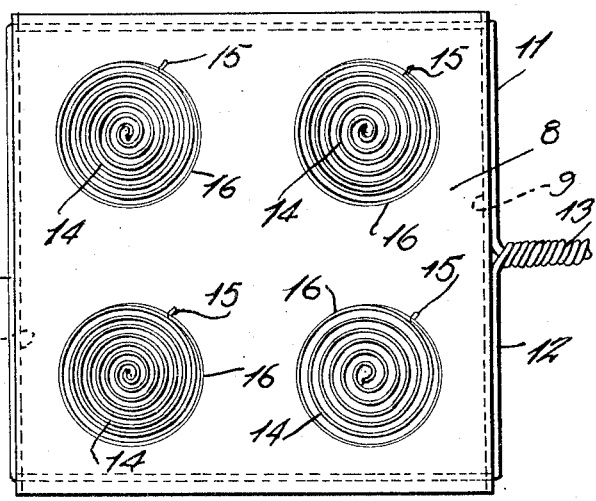
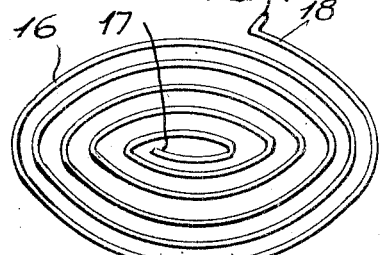
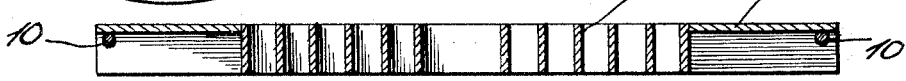
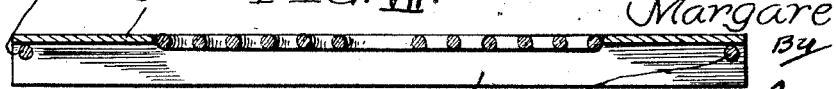
INVENTOR.
Margaret Mack.
BY
Bryant & Lowry
ATTORNEYS Patented June 4, 1929.

1,716,179

UNITED STATES PATENT OFFICE.

MARGARET MACK, OF NEW BRUNSWICK, NEW JERSEY.

UTENSIL FOR COOKING RANGES.

Application filed November 8, 1928. Serial No. 317,976.

This invention relates to improvements in cooking utensil supports of the type adapted to preserve and prevent the radiation of heat from the gas burner upon which the device is employed.

The primary object of this invention is to provide a device of the above mentioned character which may be employed on gas or cooking stoves, whereby the cooking utensil may be more quickly and efficiently heated.

Another object of this invention, is to provide a device for preserving and conserving heat which comprises comparatively few parts and which may be used upon a gas or cooking stove without altering the construction of the same.

A still further object of the invention, is to provide a device of the above mentioned character which is adapted to lie in the same plane as the top of the cooking stove and which is adapted to be provided with a heat conserving coil which is also in the same plane as the utensil supporting device.

A still further object of the invention, is to provide a device of the above mentioned character which is simple in construction, inexpensive, strong and durable and further well adapted for the purposes for which it is designated.

Other objects and advantages of this invention will become apparent during the course of the following description, forming a part of the specification and which like reference numerals are employed to designate like parts throughout the same and in which, Figure 1 is a plan view showing one of the coils included in a single utensil support;

Figure 2 is a plan view similar to Figure 1 showing two heating coils or conserving coils mounted in a cooking utensil support adapted to accommodate two cooking utensils;

Figure 3 is a plan view of another form of the invention showing four heat conserving coils mounted in a cooking utensil support for accommodating four cooking utensils;

Figure 4 is a perspective view showing one of the heat conserving coils removed from the cooking utensil support;

Figure 5 is a perspective view of a modified form of heat conserving coil;

Figure 6 is a cross-sectional view through one of the heat conserving coils showing the manner in which it is positioned and its relation to the cooking utensil support; and Figure 7 is a cross-sectional view of the cooking utensil support showing the form of heat conserving coil inserted which is illustrated in Figure 5.

Heretofore, it has been common practice to employ heat conserving coils for gas or cooking stoves supported above the burner of the stove by an elevating attachment which is provided for spacing the heat conserving coil so far from the heat burner that the heat conserving coil does not perform its intended function, such as becoming red hot to act in a manner or to radiate the heat therefrom to the cooking utensil.

Such practice is overcome by providing the heat conserving coil with means whereby the same may be placed directly over the burner and in close relation thereto for receiving the full benefit for which the device is intended.

It is further proposed to form the heat conserving coil of a flat piece of material coiled in such a manner as to make the operation of the device more efficient and further prevent the radiation and loss of heat from the burner.

For the purpose of illustration, attention is directed to the drawings, wherein is shown a cooking utensil support 8 having a pair of downwardly projecting flanges 9 formed on opposite sides thereof. A piece of wire material 10 may pass through openings in the ends of the flanges and have its ends 11 and 12 twisted together at 13 to form a suitable handle for a grasping device.

The heat conserving coil 14 is preferably formed of a flat strip of material and is coiled in a similar manner to a clock spring. The heat conserving coil 14 is provided with an outwardly turned outer end 15 which is adapted to be welded or otherwise secured in place in the opening 16 in the cooking utensil support 8 as is shown in the Figures 1, 2 and 3.

The modified form of heat conserving coil shown in Figure 5 is designated by the reference character 16 and is spirally wound from its central or inner end 17 outwardly to its outer end in which is provided with an offset portion 19. The offset portion 19 may be embedded in the cooking utensil support 8 in place of the flat type designated by the reference character 14. The manner of assembling the device shown in Figs. 5, 6 and 7 is similar to the construction shown in the other figures of the drawing but the results obtained and efficiency is accordingly different.

The cooking utensil support 8' is provided with side flanges 9' and a wire 10' is passed through openings in the ends of the flange 9' similar to wires 10 shown in the Figures 1, 2 and 3. The flanges 9 and 9' of the cooking utensil support are provided for spacing the cooking utensil supports 8 and 8' from the stove or cooking burner upon which the device is adapted to be used.

The cooking utensil support 8 may be placed over the burners on the conventional form of cooking stove so that the openings in which the coils are placed are directly above the burner so that the heat therefrom may be conducted to the heat conserving coils 14 and 16. The operator may then place a cooking utensil over the conserving coil 14 after having turned on the gas and ignited the same for the purpose of cooking or boiling food or articles. The support may be of a size completely to cover the stove top and afford warming areas for vessels placed thereon laterally of the coils.

In view of the intense heat absorbed by the coils from the burners, liquids overflowing from vessels on the support will be immediately vaporized upon coming into contact with the coils and prevent such liquids from flowing onto the burners and thereby eliminating damage to the burners.

I claim:—

1. A cooking utensil support for stoves including a flat support having an opening therein, and a heat conserving coil mounted in the opening of the flat support.

2. A heat conserver for stoves, a flat support adapted to be positioned on a stove or cooking device and having an opening, and a spiral coil having all of its convolutions in the same plane mounted in the opening.

3. A cooking utensil support for stoves including a flat support having flanged ends, and having openings therein and a heat conserving coil mounted in the opening of the flat support.

4. A cooking utensil support for stoves, a flat support having openings therein, flanges formed on opposite ends of the flat support for supporting the flat support above the surface of the cooking stove, and a heat conserving coil mounted in the opening of the flat support, said heat conserving coil having all of its convolutions in the same general plane.

5. A cooking utensil support for stoves including a support having a plane surface, flanges formed at opposite ends of the plane surface, a wire adapted to pass through openings in the ends of the flanges and across one of the flanges to the intermediate portion thereof and said wire having its ends twisted to form a handle or the like.

6. A cooking utensil support for stoves including a plane surface having openings therein, flanges formed at opposite ends of the plane surface, a wire adapted to pass through openings in the ends of the flange portions, and said wire having its ends twisted together to form a handle for the cooking utensil support and a flat coil lying in the same plane as the plane surface and in the openings therein.

7. A cooking utensil support for stoves, including a plane surface, having openings therein, flanges formed at opposite ends of the plane support, a piece of wire having its ends threaded through openings in the flanges at the end thereof, said piece of wire having its ends twisted together to form a handle for the cooking utensil support and a strip of spirally wound metal having its outer end connected to the periphery of the openings in the plane surface support and the inner end thereof adapted to be free.

8. A cooking utensil support for stoves, a flat plane surface having openings therein, flanges formed at opposite ends of the plane surface, a wire adapted to be threaded through openings in the ends of the flanges, said wire also having its ends twisted together to form a handle for the cooking utensil support and a spirally wound strip of flat material having an extension at the outer end thereof which is adapted to be secured in the periphery of the opening in the plane surface support.

In testimony whereof I affix my signature.

MARGARET MACK.